July 23, 1929.  J. A. POTTER  1,722,109
HEAT EXCHANGE APPARATUS
Filed Oct. 26, 1927   2 Sheets-Sheet 1
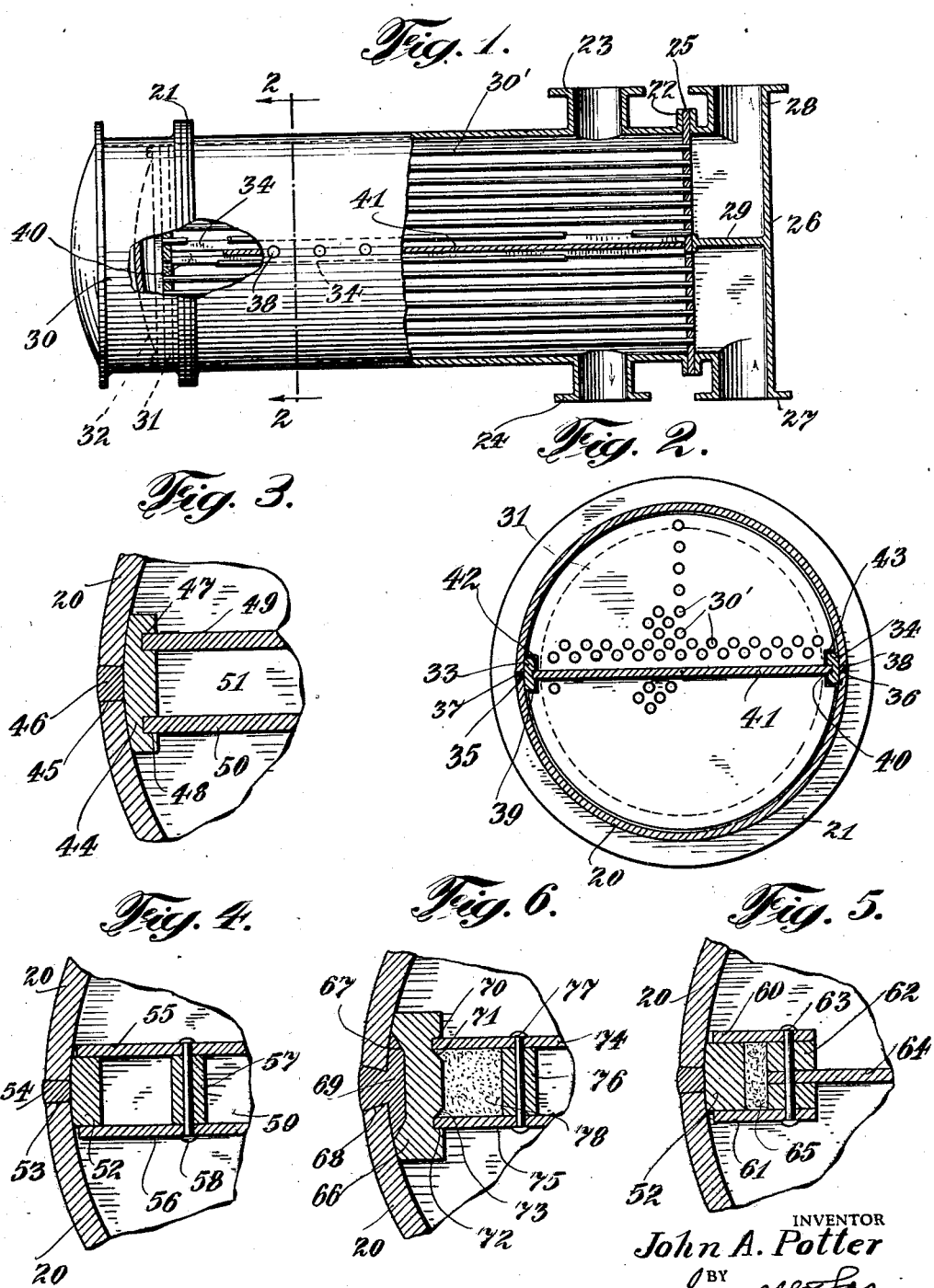

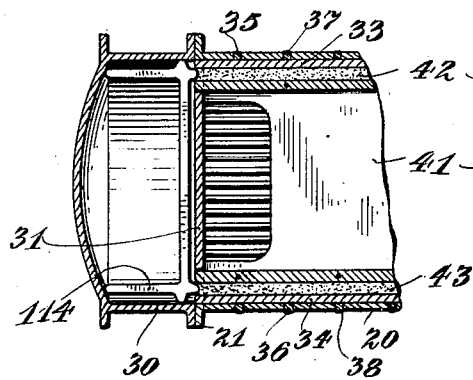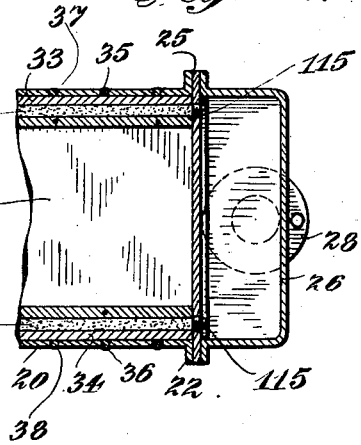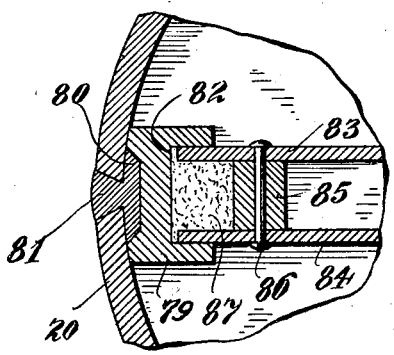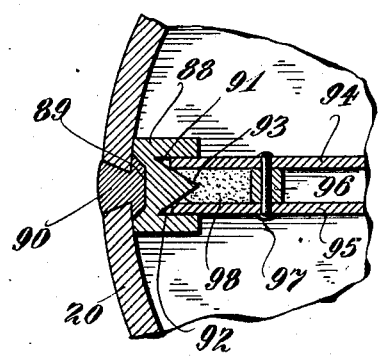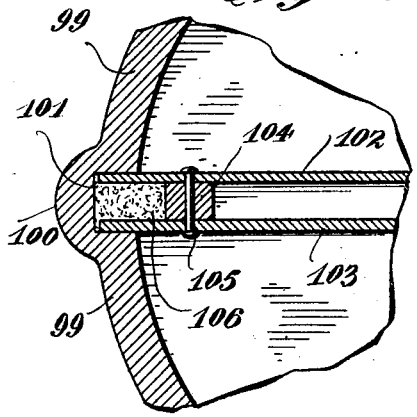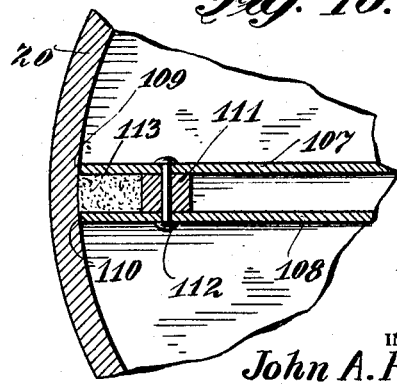

Patented July 23, 1929.

1,722,109

UNITED STATES PATENT OFFICE.

JOHN A. POTTER, OF ROSELLE, NEW JERSEY, ASSIGNOR TO FOSTER WHEELER CORPORATION, OF NEW YORK, N. Y., A CORPORATION OF NEW YORK.

HEAT-EXCHANGE APPARATUS.

Application filed October 26, 1927. Serial No. 228,738.

My present invention relates to a heat exchange apparatus. This type of apparatus is employed in various manners, for example, as surface condensers, feed water heaters, and the like in power plants and also as auxiliaries in the refinement of petroleum in the oil industry. As usually constructed, these heat exchangers comprise a shell containing a plurality of tubes and means for passing a medium to and from the space within the shell to either extract heat from the medium or to add heat thereto, together with means for forcing or otherwise passing another medium to, through and from the tubes to be utilized either for extracting heat from the medium passing through the space in the shell, or for adding heat thereto. In certain instances, it is necessary to cause the medium within the shell to follow a circuitous path in order to make the apparatus as efficient as possible. To this end it is customary to provide the shell with baffle plates. In instances where, for example, in the oil industry the medium passed through the interior of the shell is oil and a considerable pressure is necessarily employed to cause the medium to flow properly, it is essential that the joints between the baffle or baffles and the shell be made as tight as possible in order to obviate by-passing any of the medium and thereby reducing the efficiency of the apparatus. The object of my invention is an improvement in the type of baffle plates employed for the purposes indicated, as well as the construction of the joints by which the baffle plates are mounted in the shell, not only to prevent by-passing the medium, as hereinbefore stated, but also to provide a more efficient baffle from the standpoint of heat insulation, whereby the efficiency of the apparatus is materially enhanced. To this end in carrying out the invention I prefer to employ a multiple plate baffle and to place the same in the shell in such a manner as to make a substantially sure seal between the parts of the baffle plate and the shell, as will be hereinafter more particularly described.

In the drawing Figure 1 is an elevation and partial longitudinal section illustrating a form of heat transfer apparatus in which the present invention is incorporated.

Figure 2 is a section on line 2—2, Fig. 1.

Figure 3 is a partial transverse section showing another form of the invention.

Figures 4, 5, 6, 7, 8, 9, 10 are views similar to Figure 3, each showing another form of the invention and Figures 11 and 12 are partial longitudinal sections showing other modifications of the invention.

In referring to the drawing, and more particularly to Figures 1 and 2, it will be seen that the invention may be incorporated in a heat exchange apparatus which includes a shell 20 provided with flanges 21 and 22 at the ends thereof and in suitable positions with an inlet nozzle 23 and an outlet nozzle 24 for the intake and discharge of a medium to and from the shell. At the right hand end of the shell, as illustrated, there is a tube plate 25 and a box 26. In suitable positions the box 26 is constructed with an inlet nozzle 27 and an outlet nozzle 28 for the entrance and exit of another medium. Interiorly the box 26 is provided with a partition wall 29, and, as is customary, the box and the tube plate may be connected to each other and to the flange 22 of the shell by suitable bolts or other similar means. At the opposite end of the shell there is another box, as indicated at 30, and this box is adapted, in the customary manner, to be secured to the flange 21 of the shell by suitable bolts or otherwise. At this end of the shell there is a tube plate 31 provided with a bonnet 32, which may be secured thereto in any suitable manner. This tube plate 31 and its bonnet 32 form a floating head for the tubes 30', which extend between the tube plates, and, at their extremities, are suitably secured therein.

In this and other forms of heat transfer apparatus, in carrying out the invention, the shell 20 is fitted in oppositely disposed positions with rails 33 and 34. These rails may be suitably connected to the inner surface of the shell. In order, however, to make a tight joint between the rails and the shell I prefer to spot weld the rails in position. In doing so, the walls of the shell are drilled or otherwise provided with a series of holes 35 and 36, whereby it will be understood that by the use of suitable apparatus the rails may be spot welded to the walls of the shell, as indicated at 37 and 38. As illustrated in these figures of the drawing, the face of the rail 33 is provided with a groove 39 extending longitudinally thereof and similarly the rail 34 is provided with a groove 40. Extending between these rails and fitting within the grooves thereof, there is a baffle plate 41. This baffle plate divides the interior of the shell into two compartments, separating the tubes into a like number of banks, as shown in Figure 2. In order to provide for the withdrawal of the floating tube plate and the banks of tubes as a unit the peripheral portion of the tube plate is notched, as indicated at 42 and 43, these notches being of sufficient extent to receive the rails in withdrawing the tube bundle from the apparatus.

In the operation of this type of apparatus, as it will be understood, one medium enters the box 26 by the inlet nozzle 27 and passes through the inlet chamber in the box to one bank of tubes, thence to the chamber between the tube plate 31 and the bonnet 32 to the other bank of tubes, and thence to the outlet chamber in the box 26 to the outlet nozzle 28 thereof. The other medium enters the shell by way of the nozzle 23, passes above the baffle, surrounding one bank of tubes, to the other end of the shell, thence around the edge of the baffle to the other side of the shell, surrounding the tubes therein, and thence to the outlet or discharge nozzle 24.

In carrying out the invention the baffle plate may consist of a single wall, but preferably the joint between the edges of the baffle plate and the rails or other equivalent devices secured interiorly to the walls of the shell is made with a multiplicity of parts, that is, there are two or more joints between the edges of the baffle plate and the rails. Furthermore, the baffle plate itself may be formed to include a multi wall or part structure. As shown in Figure 3 a rail member 44 is connected to the wall of the shell by providing the shell with a series of apertures, one of which is indicated at 45, and at each of the apertures the rail is spot welded to the shell, as indicated at 46. In this structure the face of the rail is made with two longitudinally disposed grooves 47 and 48 to receive the edge portions of the baffle plates 49 and 50 between which, as will be understood, there is a compartment or pocket 51 which constitutes both an insulating medium and also, obviously, a means for minimizing the tendency for the liquid to by-pass or to leak from one side of the baffle to the other, and, as illustrated in Fig. 4, the rail 52 is secured to the shell 20 in the same manner as hereinbefore described, that is, by providing the shell with a series of apertures, one of which is indicated at 53, and by spot welding the rail to the shell, as indicated at 54. In this instance it is unnecessary to machine the rails, inasmuch as the baffle plates 55 and 56 are adapted to spring over the opposite sides of the rail, as is plainly shown in this construction. In this instance the baffle plates 55 and 56 are preferably connected at suitable intervals adjacent the edges thereof by spacer blocks 57 and suitable bolts or rivets 58. Between the plates 55 and 56 there is a space 59 forming a pocket which is in all respects similar to the pocket 51 in the form of the invention shown in Fig. 3.

A somewhat similar construction is also illustrated in Fig. 5 wherein the rail member 52 is spot welded to the shell and the sides are adapted to be engaged by the baffle rails 60 and 61, which are suitably spaced apart and connected by a spacer rail 62 and bolts or rivets 63, which also are employed to connect and complete the baffle by a plate 64, which, in this instance, is a single plate. Also, there is a double joint connection between the baffle rails 60 and 61 and the rail 52. In this structure there is a pocket between the rail 52 and the spacer rail 62, which may be filled with any suitable packing material, as indicated at 65, in order to further increase the necessary contact between the rail 52 and the baffle rails 60 and 61 to insure a tight joint.

In Figure 6 there is illustrated a somewhat similar and equivalent construction. In the forms of the invention, as hereinbefore described and as will be apparent, in order to insure an absolutely tight joint between the shell and the rail it is necessary that the face of the rail adjacent the inner surface of the shell be made to conform thereto more or less closely. It is also obvious that due to irregularities in the shell and possible irregularities in the adjacent face of the rail, this tight joint may not always be effected even by spot welding the parts to one another. In order to overcome this difficulty the rail 66 may have one face thereof formed, with a recess 67, this face of the rail being the face adjacent the inner surface of the shell, and instead of being cylindrical the holes or apertures in the shell may be tapered or conical, having a larger outer than inner diameter, as indicated at 68. Now, as will be readily apparent, in spot welding the rail in this type of shell as indicated at 69 the material will not only fill the hole or aperture of the shell, but will also fill the recess in the rail, thereby insuring a leak proof joint and one which also obviates any possibility of the rail becoming loose or separated from the shell because of the conical opening as employed in the shell. In this form of the invention the opposite face of the rail 60 is provided with grooves, the distant faces of which, as indicated at 70 and 72, are substantially parallel while the adjacent faces of which are inclined, as indicated at 71 and 73. The face defining the base of each recess is preferably at a right angle to the outer face thereof and is of a width substantially the same as the thickness of the baffle plates 74 and 75. These baffle plates 74 and 75 are connected by a spacer rail 76 and bolts or rivets 77, so that the edge portions thereof are adapted to enter the recess in the rail when the edges thereof are sealed against the faces defining the bases of the recess. This structure also provides a space or pocket between the rail 66 and the baffle or spacer rail 76 and this pocket may be filled with any suitable packing material as indicated at 78. Obviously in this structure the leak proof provision is increased by the wedging action between the inner surfaces of the baffle plates and the inclined faces of the grooves; for example, if the pressure is greater against the baffle plate 74 than against the baffle plate 75 any tendency to leak may force the edge portions of the baffle plate 74 against the inclined face of the groove in which it fits, and due to the wedging action will automatically tend to close any passage through which the medium might leak, and, of course, the same condition maintains in regard to the baffle plate 75 should the pressure on this plate be greater than that on the plate 74.

In the structure shown in Figure 7 the rail 79 has a recess 80 provided therein similar to the recess 67 in the structure shown in Figure 6, and this rail 79 may be connected to the shell by being spot welded thereto, as indicated at 81. In this form of the invention the opposite face of the rail is provided with a relatively wide groove as indicated at 82 adapted to receive the edge portions of the baffle plates 83 and 84 when the edge portions of the plates are forced or squeezed into the groove. In a manner similar to those hereinbefore described, the baffle plates 83 and 84 are spaced and secured together by a spacer rail 85 and suitable bolts or rivets 86. This construction also provides for a space or pocket between the rail 79, the edge portions of the baffle plates 73 and 84 and the spacer rail 85, which space may be filled with a suitable packing, as indicated at 87. The structure shown in Figure 8 is somewhat similar to that illustrated in Figure 6. In Figure 8, however, the rail 88 is provided with a recess 89 and is connected to the shell by being spot welded thereto, as indicated at 90, as in other forms of the invention, but in this structure the rail is somewhat narrower and V shaped grooves 91 and 92 provide a wedge shaped projection 93, which extends within and lies between the edge portions of the baffle plates 94 and 95. The edge portions of these baffle plates are adapted to extend into the V shaped grooves so that these parts function in a manner similar to that hereinbefore described in connection with the structure shown in Figure 6. In a manner similar to that hereinbefore described, the baffle plates 94 and 95 are spaced and connected by a spacer rail 96 and rivets or bolts 97. This likewise provides for a space or pocket between the rail, the edge portions of the baffle plates and the spacer rail, which space may be filled with a suitable packing as indicated at 98.

In order to make adequate provision for the working pressure and temperature within the shell, the forms of the invention as hereinbefore described include a shell which is preferably made of steel. In some instances where the shells are of smaller dimensions or are not intended to carry an excessive pressure or temperature, the shell may be made of cast iron or other similar material. As shown, for example, in Figure 9, the shell 99 of the exchanger may be made of cast iron and in suitable oppositely disposed positions provided with longitudinal ribs, one of which in this figure is indicated at 100, the shell being interiorly grooved, as indicated at 101, to receive the edge portions of baffle plates 102 and 103 to make the required tight joint between the shell and the baffle plates. Also as illustrated, in this structure these baffle plates are spaced and connected by a spacer rail 104 and rivets or bolts 105. This makes provision for a pocket that may be filled with a suitable packing, as indicated at 106. In other instances where the pressure within the shell is relatively small it may be possible to dispense entirely with both the rail and the groove in the shell. For example, as shown in Figure 10, the baffle plates 107 and 108 may be so constructed that the edges 109 and and 110 thereof will contact directly with the walls of the shell and these baffle plates being connected by a spacer rail 111 and bolts or rivets 112 provide a pocket 113 which when filled with a suitable packing will make the joint with the shell sufficiently tight to prevent any material leakage except possibly under excessive pressures.

As illustrated in Figure 11 of the box 30 at the floating tube plate end of the exchanger may be fitted with a yoke 114 so constructed as normally to extend across the box and to overlie the notches 42 and 43 in the floating tube plate in order to maintain the packing in position and to maintain the mediums in their respective chambers in the apparatus.

Furthermore, in instances where it may be necessary or desirable to remove the old and replace the same by a new packing the fixed tube plate at the opposite end of the exchanger, in suitable positions, may be fitted with plugs 115 turned down in the tapped openings, which, when the plugs are removed, communicate with the pockets containing the packing. It will be understood, of course, that by removing the plugs and the packing retaining yoke that the packing may be removed by passing a suitable tool through the plug openings and that the new packing may be put in place, preferably, however, from the opposite end of the apparatus. It is, furthermore, to be understood that it is discretionary as to whether or not a packing is employed, and, if employed, that the packing may be of any suitable material to answer the purposes required of it.

It will be understood that as hereinbefore described the heat exchanger is provided with a single baffle plate irrespective of the number of parts of which it may be made, but that in carrying out the invention the heat exchanger may be provided with any number of necessary baffle plates, each of which may be constructed in any of the manners hereinbefore described or manners equivalent therewith without departing from the nature and spirit of the invention.

I claim as my invention:

1. In a heat exchange apparatus, a shell, a plurality of tubes therein, tube plates to which at their ends the said tubes are connected, a rail secured to the shell, and a baffle plate dividing the shell into compartments interiorly and making a multipart substantially leak proof joint with the said rail.

2. In a heat exchange apparatus, a shell, a plurality of tubes therein, tube plates to which at their ends the said tubes are connected, a rail spot welded to the shell, and a baffle dividing the shell interiorly into compartments and making a substantially leak proof joint with the said rail.

3. In a heat exchange apparatus, a shell, a plurality of tubes therein, tube plates to which at their ends the said tubes are connected, a rail having a recessed face adjacent the inner surface of the shell, the said rail being spot welded to the shell at the recessed portion of the rail, and a baffle plate dividing the interior of the shell into compartments and making a substantially leak proof joint with the said rail.

4. In a heat exchange apparatus, a shell, a plurality of tubes therein, tube plates to which the ends of the tubes are connected, a rail having a recessed face, the said rail being adapted to extend longitudinally of the shell with the recessed face thereof adjacent the inner surface of the shell and in alignment with a series of holes placed in the shell, the said rail being spot welded to the shell at the said holes and recessed portion of the rail, and a baffle plate dividing the interior of the shell into compartments and making a substantially leak proof joint with the said rail.

5. In a heat exchange apparatus, a shell, a plurality of tubes therein, tube plates to which at the ends thereof the said tubes are connected, a rail having a recessed face and extending interiorly of the shell with the recess face thereof adjacent the inner surface of the shell and in alignment with a series of longitudinally disposed and tapered holes in the said shell, the rail being spot welded to the shell at the said holes therein and the recessed portion of the rail, the opposite face of the said rail being provided with a longitudinal groove, and a baffle plate adapted to divide the interior of the shell into compartments and to engage the grooved face of the rail to form a substantially leak proof joint therewith.

6. In a heat exchange apparatus, a shell, a plurality of tubes, tube plates in which the tubes at the ends thereof are connected, a rail extending longitudinally of the shell and connected thereto, and a multipart baffle plate dividing the interior of the shell into compartments and adapted to co-operate with the said rail to make a multipart substantially leak proof joint therewith.

7. In a heat exchange apparatus, a shell, a plurality of tubes, tube plates in which the tubes at the ends thereof are secured, a rail secured to the shell, a multipart baffle comprising spaced plates adapted at their edge portions to co-operate with the rail to form a multipart substantially leak proof joint therewith.

8. In a heat exchange apparatus, a shell, a plurality of tubes, tube plates in which the tubes at the ends thereof are secured, a rail secured to the shell, a baffle comprising a plurality of plates and means for connecting the plates and spacing the same from one another, the said plates being adapted to co-operate with the said rail to form a multipart substantially leak proof joint between them.

9. In a heat exchange apparatus, a shell, a plurality of tubes, tube plates in which the tubes at the ends thereof are secured, a rail secured to the shell, a baffle comprising a plurality of plates, spacer rails connected to the said plates to maintain the same in a spaced relationship, and means for connecting the said plates and spacer rails, the said baffle at the edge portions thereof being adapted to co-operate with the said rail to form a multipart substantially leak proof joint between them.

10. In a heat exchange apparatus, a shell, a plurality of tubes, tube plates in which the tubes at the ends thereof are secured, a rail secured to the shell, a baffle comprising a plurality of plates, a spacer rail extending between the plates, means for securing the plates and spacer rail together, the edge portions of the plates being adapted to co-operate with the rail to form a substantially leak proof joint between them and to provide a pocket within the plates and between the said rail and spacer rail, and a packing material filling the said pocket.

11. In a heat exchange apparatus, a shell, a plurality of tubes, tube plates in which at their ends the said tubes are secured, a rail connected interiorly to the said shell and extending longitudinally thereof, the said rail being provided in the inner face thereof with longitudinally disposed grooves, and a baffle comprising spaced plates connected to one another so that the edge portions thereof are adapted respectively to engage in the said grooves in the face of the rail to make a multipart substantially leak proof joint between them.

12. In a heat exchange apparatus, a shell, a plurality of tubes therein, tube plates in which at the ends thereof the said tubes are connected, a rail extending longitudinally of the shell and interiorly thereof, the said rail in the inner face thereof having longitudinally disposed angular grooves, a multipart baffle comprising two plates, and means for connecting and spacing the same, the edge portions of the said plates being adapted to enter the angular grooves in the said rail to form a substantially leak proof joint therewith.

13. In a heat exchange apparatus, a shell, a plurality of tubes therein, tube plates in which at the ends thereof the said tubes are connected, a rail extending longitudinally of the shell and interiorly thereof, the said rail in the inner face thereof having longitudinally disposed angular grooves, a multipart baffle comprising two plates, a spacer rail, and means for connecting the plates and spacer rail to secure the plates to one another in a spaced relationship, the said plates at the edge portions thereof being adapted to form a substantially leak proof joint with the grooved face of the rail and to provide a pocket between the edge portions of the plates and the said rail and spacer rail, and a packing material filling the said pocket.

14. In a heat exchange apparatus, a shell, a plurality of tubes, tube plates in which the tubes at the ends thereof are connected, one of the said tube plates being adapted to be withdrawn through the shell, a rail connected interiorly of the shell and extending longitudinally thereof, the peripheral portion of the tube place adapted to be withdrawn through the shell being notched to receive the said rail when the tube plate is so withdrawn, and a baffle plate dividing the interior of the shell into a plurality of compartments and adapted to co-operate with the said rail to form a multipart substantially leak proof joint therewith.

15. In a heat exchange apparatus, a shell, a plurality of tubes therein, tube places between which the said tubes extend and to which the said tubes are connected, one of the tube plates being adapted to be connected to the shell and the other tube plate to be withdrawn through the shell, a rail connected interiorly to the shell and extending longitudinally thereof, the tube plate which is adapted to be withdrawn through the shell being provided with a peripheral notch to receive the said rail when the tube plate is so withdrawn, the rail being provided in its outer face with longitudinally disposed grooves, a baffle comprising a plurality of plates each adapted at its edge portion to engage a groove in the rail to form a substantially leak proof joint therewith and to form a pocket between the plates, and means co-operating with the tube plate adapted to be withdrawn through the shell for normally closing the said notch in the peripheral portion thereof.

16. In a heat exchange apparatus, a shell, a plurality of tubes therein, tube plates between which the said tubes extend and to which the said tubes are connected, one of the tube plates being adapted to be connected to the shell and the other tube plate to be withdrawn through the shell, a rail connected interiorly to the shell and extending longitudinally thereof, the tube plate which is adapted to be withdrawn through the shell being provided with a peripheral notch to receive the said rail when the tube plate is so withdrawn, the rail being provided in its outer face with longitudinally disposed grooves, a baffle comprising a plurality of plates, a spacer rail between the plates, and means for securing the plates and spacer rail together, the edge portions of the said plates being adapted to engage the grooves in the said rail to form a multipart substantially leak proof joint between them and to provide a pocket between the said plates, the rail and the spacer rail, a packing material in the said pocket, and means for co-operating with the said tube plate adapted to be withdrawn through the shell for covering the peripheral notch in the tube plate and closing the said pocket.

17. In a heat exchange apparatus, a shell, a plurality of tubes therein, tube plates between which the said tubes extend and to which the said tubes are connected, one of the tube plates being adapted to be connected to the shell and the other tube plate to be withdrawn through the shell, a rail connected interiorly to the shell and extending longitudinally thereof, the tube plate which is adapted to be withdrawn through the shell being provided with a peripheral notch to receive the said rail when the tube plate is so withdrawn, the rail being provided in its outer face with longitudinally disposed grooves, a baffle comprising a plurality of plates, a spacer rail between the plates, and means for securing the plates and spacer rail together, the edge portions of the said plates being adapted to engage the grooves in the said rail to form a multipart substantially leak proof joint between them and to provide a pocket between the said plates, the rail and the spacer rail, a packing material in the said pocket, means for co-operating with the said tube plate adapted to be withdrawn through the shell for covering the peripheral notch in the tube plate and closing the said pocket, and means for gaining access to the said pocket to the tube plate which is adapted to be normally connected to the shell.

18. In a heat exchange apparatus, a shell, a plurality of tubes therein, tube plates to which at their ends the said tubes are connected, a rail secured to the said shell, and a baffle plate dividing the shell interiorly into compartments and making a substantially leak proof joint with the said rail.

Signed by me this 28th day of September, 1927.

JOHN A. POTTER.